Figure 1:
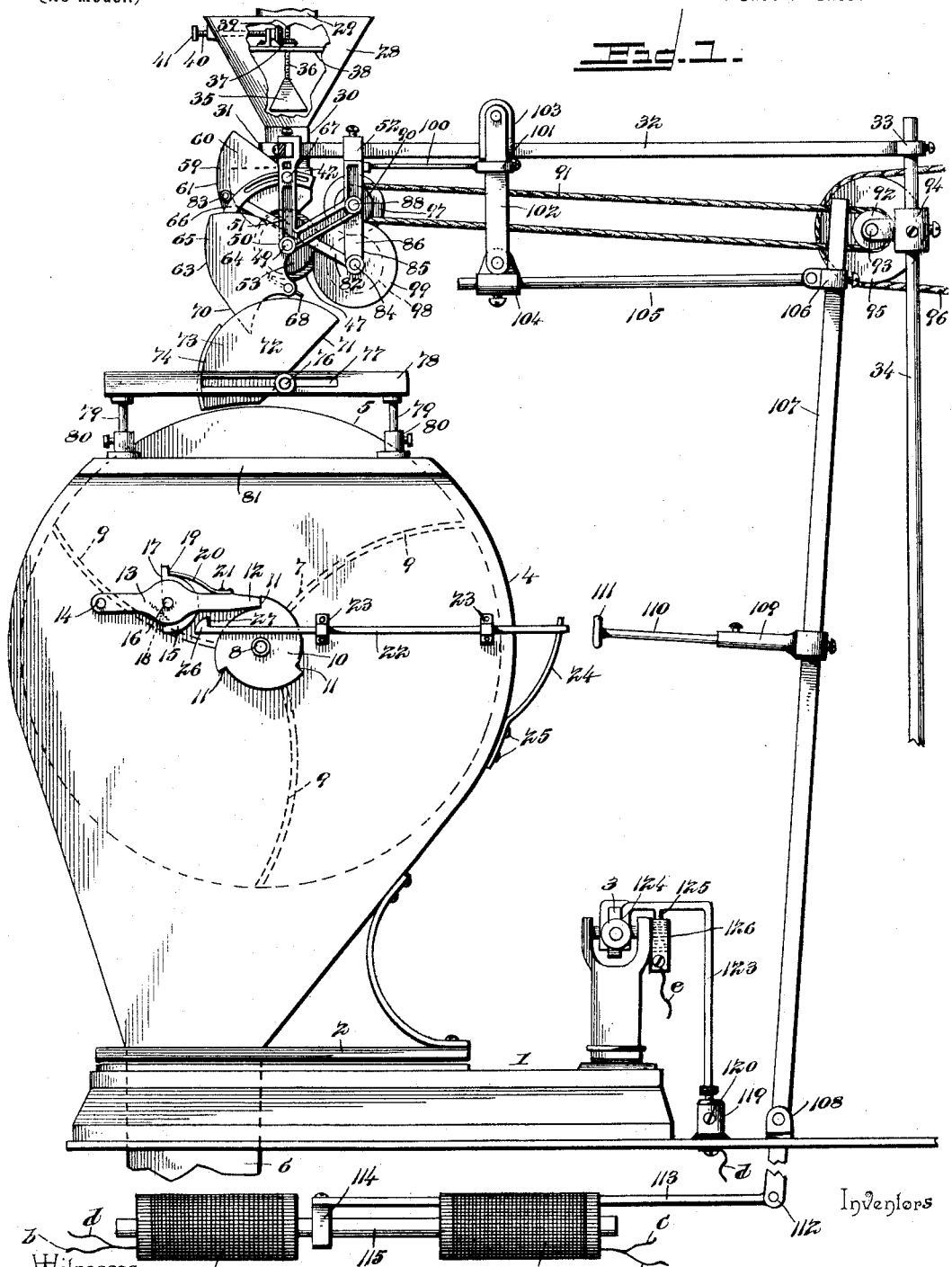

No. 618,129. Patented Jan. 24, 1899.
J. & D. DE R. A. OUTCALT.
AUTOMATIC WEIGHER.
(Application filed Oct. 16, 1896.)

(No Model.) 6 Sheets—Sheet 1.

Witnesses
Inventors
John Outcalt
David DeRyster Acker Outcalt
By their Attorneys, No. 618,129. Patented Jan. 24, 1899.
J. & D. DE R. A. OUTCALT.
AUTOMATIC WEIGHER.
(Application filed Oct. 16, 1896.)
(No Model.) 6 Sheets—Sheet 2.
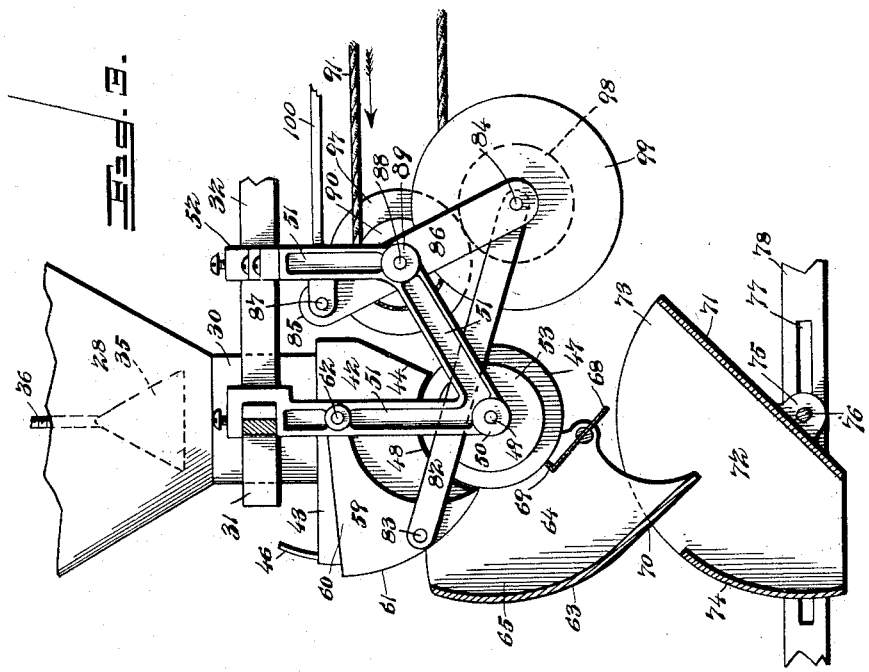
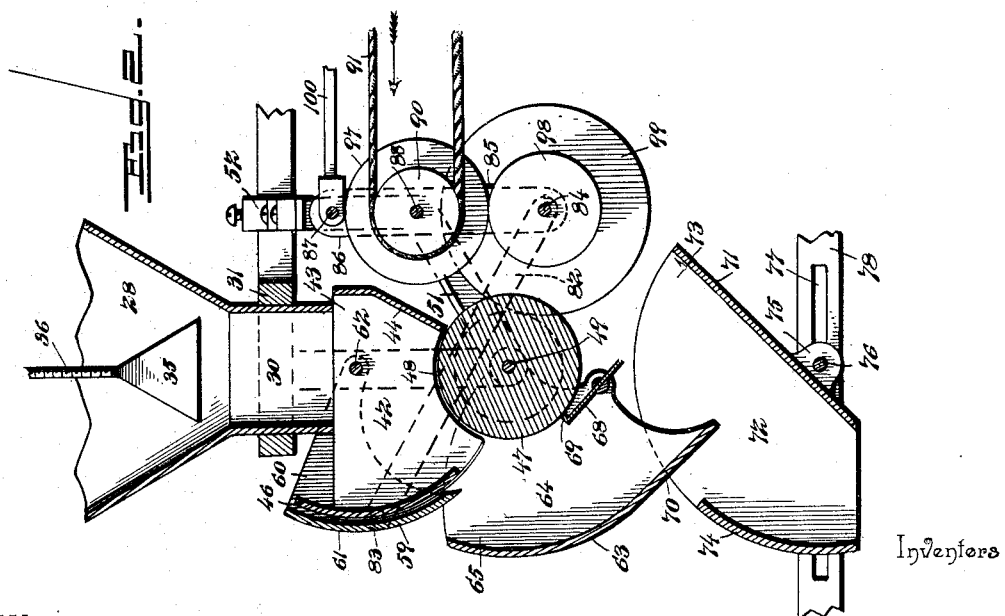
Witnesses
E. S. Stewart
D. P. Hollhaupter
By their Attorneys,
C. A. Snow & Co.
Inventors
John Outcalt
David DeRyster Acker Outcalt

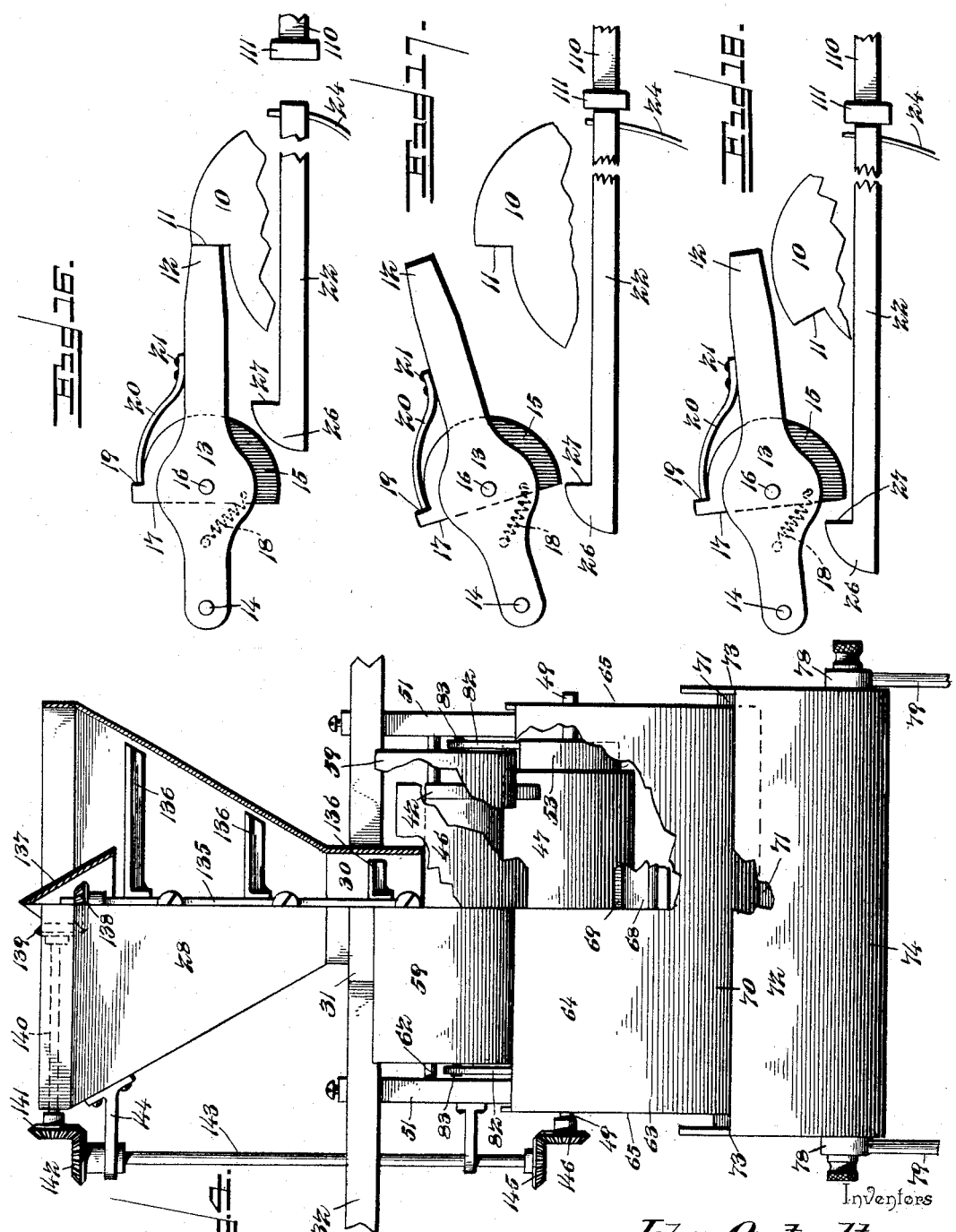

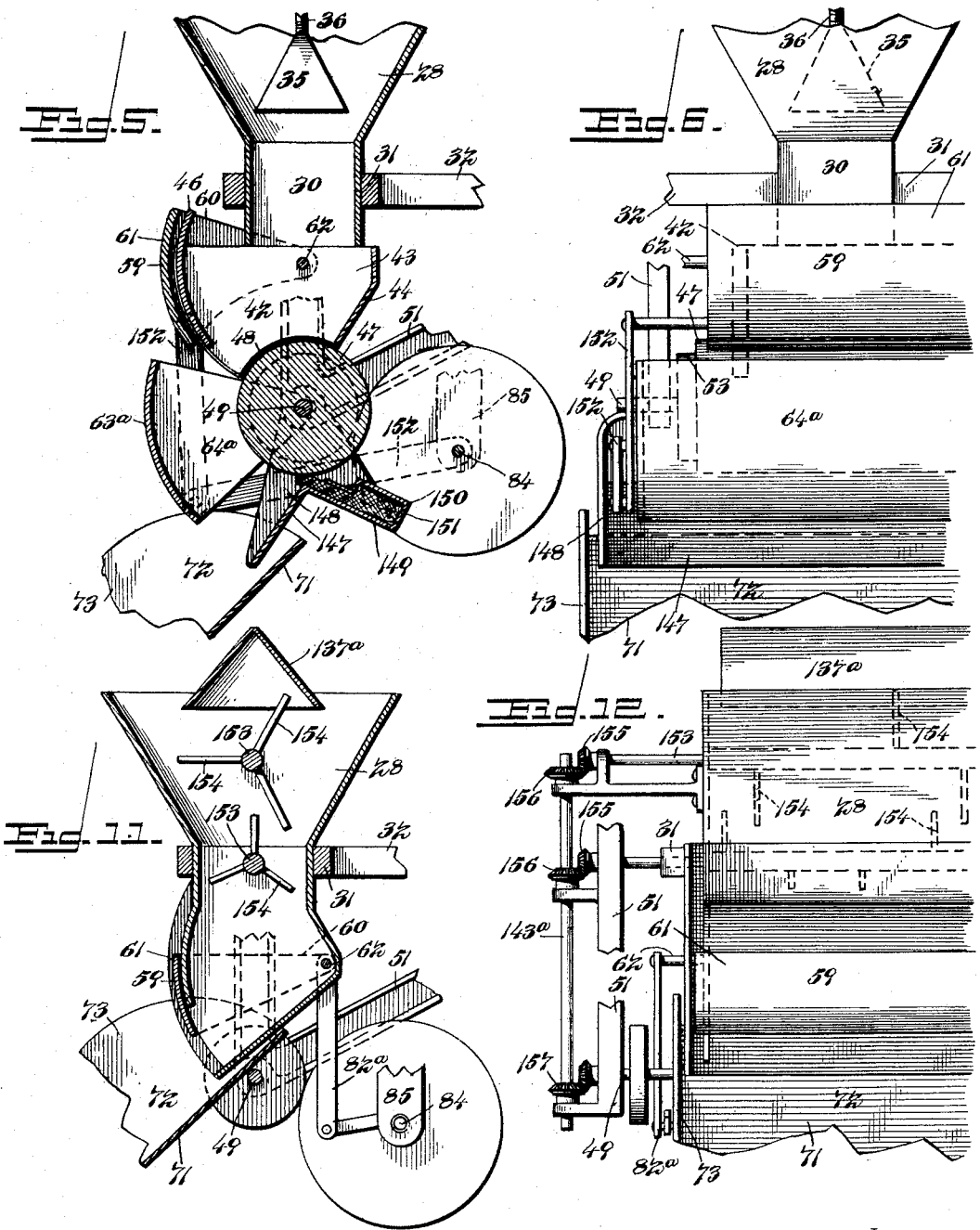

No. 618,129. Patented Jan. 24, 1899.
J. & D. DE R. A. OUTCALT.
AUTOMATIC WEIGHER.
(Application filed Oct. 16, 1896.)
(No Model.) 6 Sheets—Sheet 5.
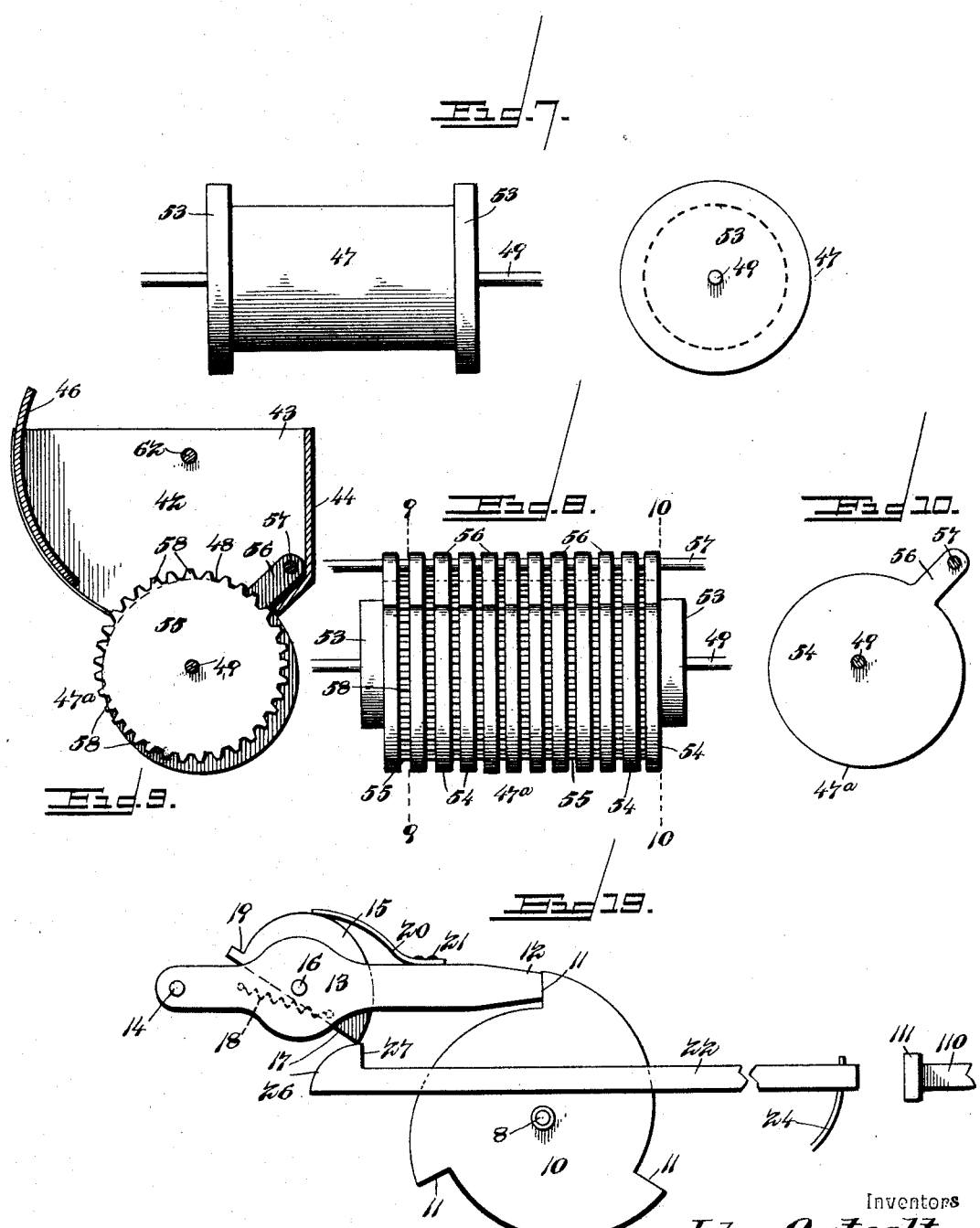
Witnesses
Inventors
John Outcalt
David DeRyster Acker Outcalt
By Their Attorneys,

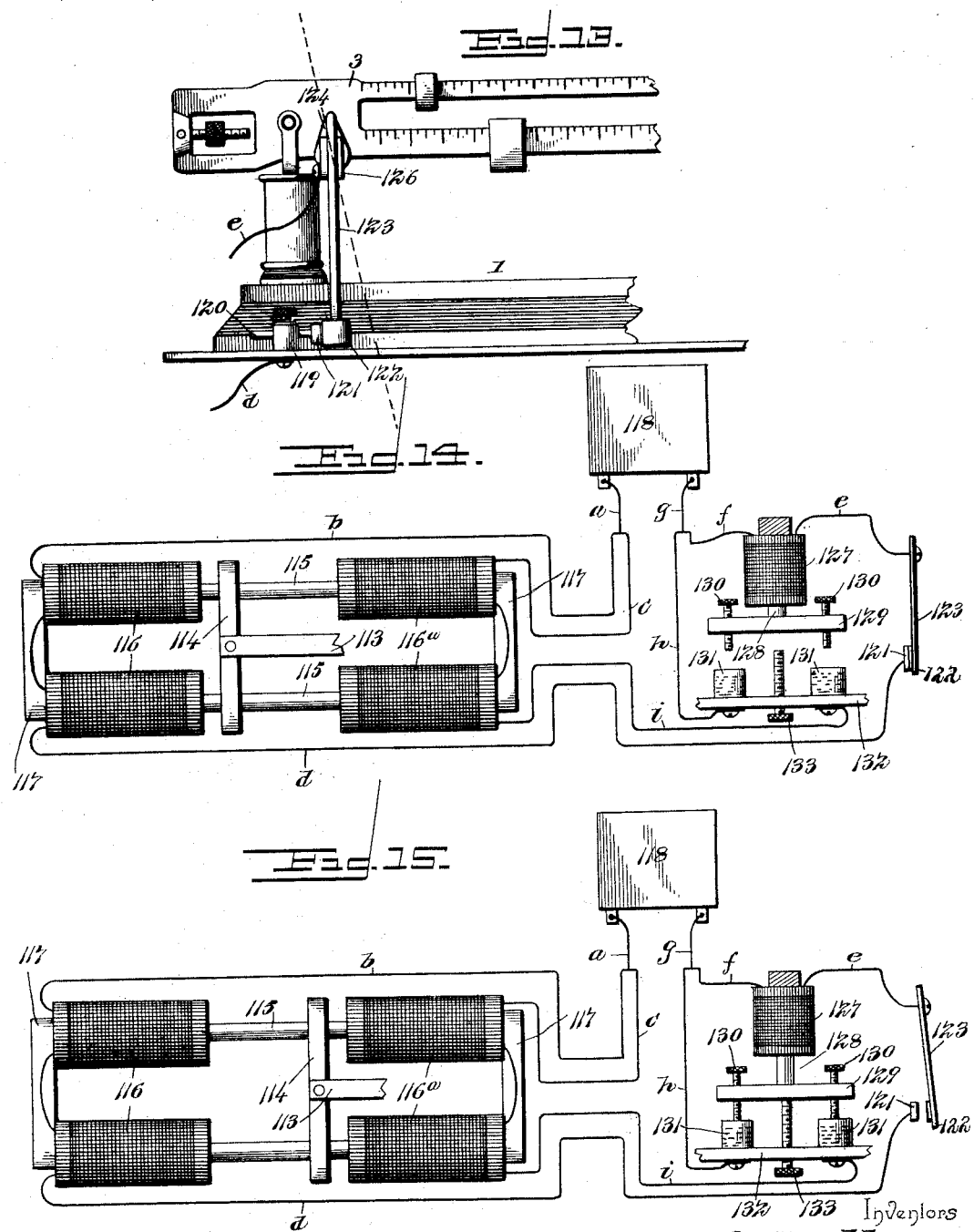

UNITED STATES PATENT OFFICE.

JOHN OUTCALT AND DAVID DE RYSTER ACKER OUTCALT, OF SPOTSWOOD, NEW JERSEY.

AUTOMATIC WEIGHER.

SPECIFICATION forming part of Letters Patent No. 618,129, dated January 24, 1899.

Application filed October 16, 1896. Serial No. 609,091. (No model.)

*To all whom it may concern:*

Be it known that we, JOHN OUTCALT and DAVID DE RYSTER ACKER OUTCALT, citizens of the United States, residing at Spotswood, in the county of Middlesex and State of New Jersey, have invented a new and useful Automatic Weighing Apparatus, of which the following is a specification.

This invention relates to automatic weighing apparatus, and has more particular reference to automatically-controlled feeding mechanism for weighing-receptacles or the like to provide positive means for promptly cutting off and starting up the feed of the substance to be weighed.

To this end the invention contemplates a novel construction of feed mechanism in connection with certain other improvements especially adapted for use in connection with weighing-machines of the type shown in our former patent, No. 511,647, and providing accurate and positive means for automatically weighing regulated quantities of matter; and the invention also contemplates the adaptation of the feed mechanism for use with any form of machine or apparatus requiring an automatic control of the substance fed thereto.

With these and other objects in view, which will readily appear as the nature of the invention is better understood, the same consists in the novel construction, combination, and arrangement of parts hereinafter more fully described, illustrated, and claimed.

In the drawings, Figure 1 is a side elevation of a complete weighing apparatus embodying the improvements contemplated by this invention. Fig. 2 is an enlarged vertical sectional view of the automatic feeding mechanism of the apparatus, showing the valve open and the parts adjusted during the operation of feeding or delivering the material into the weighing-machine. Fig. 3 is a side elevation, partly in section, of the construction illustrated in Fig. 2, showing the cut-off valve closed and the parts positioned when the flow of material is cut off from the weighing machine or receptacle. Fig. 4 is a front view, partly in section, of the feeding mechanism, showing the storage or feed hopper equipped with a vertically-arranged stirring device to adapt the mechanism for feeding such materials as snuff, flours, and the like. Fig. 5 is a vertical sectional view of a modified form of the feed mechanism provided with a double cut-off and another form of roll-cleaning device. Fig. 6 is a front elevation, partly in section, of the construction shown in Fig. 5. Fig. 7 shows a front elevation and end view of one form of the feed-roll. Fig. 8 is a front elevation of another form of feed-roll. Fig. 9 is a detail sectional view of the construction shown in Fig. 8 on the line 9 9 of such figure. Fig. 10 is a similar view on the line 10 10 of Fig. 8. Fig. 11 is a vertical sectional view of a modified form of the feeding mechanism used without a rotating feed-roll. Fig. 12 is a front elevation of the construction shown in Fig. 11. Fig. 13 is an enlarged detail elevation of the circuit-closing connections with the scale-beam of the scales. Figs. 14 and 15 are diagrammatic plan views of the solenoids and the circuit-wire connections of the electrical system of the apparatus. Figs. 16, 17, 18, and 19 are enlarged detail views illustrating different positions of the combined lock and release device for the weighing-wheel of the weighing-machine of the apparatus.

Referring to the accompanying drawings, the numeral 1 designates a platform-scale of any approved construction, having the scale-platform 2 and the ordinary scale-beam 3, located at one side of the platform and connected with the ordinary weighing devices of the scales, said beam 3 being set to weigh any desired quantity of matter which is to be weighed by the apparatus contemplated by this invention.

The several improvements contemplated by the present invention are designed especially for use in connection with a weighing-receptacle 4 of a cylindrical shape and suitably mounted on top of the scale-platform 2. The cylindrical weighing receptacle or case 4 is provided at its upper side with a feed or inlet opening 5, and at its lower side is contracted to form a bottom discharge-spout 6, conveniently arranged to project below the scale-platform to discharge the weighed material or substance into any suitable receiving-receptacle. The said weighing receptacle or case 4 accommodates for rotation therein a revolving-compartment weighing-wheel 7, mounted on a transverse wheel-shaft 8, journaled in diametrically opposite sides of the receptacle or case. The said revolving-compartment weighing-wheel essentially comprises a series of radially-extending and regularly-spaced curved buckets 9, traveling in close proximity to the rim of the receptacle and providing for holding the quantity of matter to be weighed at one side of the center of the wheel, so that when the wheel is released and allowed to rotate the compartments formed between the buckets 9 are relieved of their contents, which discharge through the spout 6.

To provide for locking the compartment weighing-wheel against rotation and releasing the same at the proper time, the wheel-shaft 8 has fitted on one end thereof, exterior to the weighing receptacle or case, a notched stop or catch disk 10. The stop or catch disk at one end of the wheel-shaft 8 is formed with a series of peripheral catch-notches 11, adapted to be engaged automatically by the free end 12 of a pawl-lever 13, pivotally mounted at one end, as at 14, on one side of the weighing receptacle or case. The said pawl-lever 13 has pivotally mounted thereon intermediate of its ends a segmental cam-plate 15, turning on the pivot-pin 16, which pivotally fastens the said cam-plate to the pawl-lever at one side thereof. The segmental cam-plate 15 normally assumes an upright position, with its straight or flat side 17 disposed approximately at right angles to the length of the lever 13, and may be conveniently caused to normally seek this position by means of a light retractile spring 18, connected at one end with the cam-disk and at its other end with the pawl-lever, although other means may be employed for securing this result. The said normally-upright cam-plate 15 is provided at its upper corner with a stop-shoulder 19, which engages against the free end of a check-dog 20, secured fast at one end, as at 21, to the upper side of the pawl-lever 13 and serving to prevent the cam-plate from turning when the lower rounded side thereof is engaged by the inner end of a sliding release-rod 22.

The sliding release-rod 22 is arranged in a horizontal position at one side of the weighing receptacle or case and is mounted to slide in the guides 23, fitted to said receptacle or case, and at its outer end the said rod is engaged by the free end of a retracting-spring 24, the other end of which is secured fast, as at 25, to the receptacle or case, and the said spring 24 normally exerts a tension in a direction to draw the rod 22 outward. The said rod 22 is adapted to be automatically moved in an inward direction by means to be hereinafter referred to and is provided at its inner end with a rounded contact-foot 26, having a shouldered side 27 and adapted to ride in contact with the lower rounded portion of the cam-plate 15. Normally the parts of the combined lock and release device for the weighing-wheel are in the positions shown in Figs. 1 and 16 of the drawings; but when the release-rod 22 is moved inward the contact-foot 26 thereof rides under the lower rounded portion of the cam-plate 15 and elevates the pawl-lever 13 to the position shown in Fig. 17, thereby carrying the free end of said lever out of the peripheral notch of the stop-disk 10 and releasing the weighing-wheel, so as to permit the same to turn and discharge the weighed matter. After the release-rod 22 raises the pawl-lever in the manner described the shouldered side 27 of the contact-foot 26 passes the straight side of the cam-plate 15, thereby allowing the lever 13 to instantly drop to the position shown in Fig. 18, so that its free end will be ready to engage with the next notch of the wheel 10, and thereby automatically lock the weighing-wheel against rotation until it has received the prescribed quantity of matter. As soon as the pressure is removed from the release-rod 22 the spring 24 retracts the same in an outward direction, which movement carries the shouldered foot 26 against the lower corner of the cam-plate 15 and oscillates the same on its axis, as shown in Fig. 19, to permit the rod 22 to resume its normal position, and after the shouldered foot 26 passes the cam-plate in the manner described the latter resumes its normal position ready for the releasing operation to be repeated.

Arranged directly above and substantially in line with the feed or inlet opening 5 in the upper side of the weighing receptacle or case 4 is a flared storage or feed hopper 28, supplied with the material to be weighed by the delivery-spout 29, leading from the source of supply, so as to deliver the material directly into the hopper 28. The said hopper 28 is contracted toward its lower end to form a cylindrical discharge neck or spout 30, which is conveniently fitted in a supporting-yoke 31, carried at one end of frame-rods 32, adjustably fitted at one end, as at 33, on the upper portion of upright frame-rods 34, which, in conjunction with the horizontal frame-rods 32, provide the main supporting-frame for the feed mechanism of the apparatus. The flared storage-hopper 28 is designed to constantly receive a supply of the material to be weighed and has arranged for adjustment therein, in line with and above its discharge neck or spout 30, a regulating-cone 35, having extended upwardly from its apex a screw-stem 36, working in a pinion-nut 37, supported on a cross-bar 38 within the hopper 28 and meshing with an adjusting-pinion 39, mounted on the inner end of a short adjusting-shaft 40, journaled in suitable bearings in the hopper 28, near its upper open end, and provided at its outer end with a finger-knob 41, which when manipulated through the medium of the meshing pinions 39 and 37 and the screw-stem 36 provides means for raising and lowering the cone 35 to regulate the rate of feed which it is desirable to perinit through the discharge neck or spout 30 of the hopper. The cone 35, while used to a certain extent to control or regulate the rate of discharge of the material through the neck or spout 30, primarily relieves the pressure of the column of material entering into the hopper through the delivery-spout 29, thereby insuring a more uniform flow of the material, especially as the amount or weight thereof from the source of supply becomes less and less.

The material which passes through the neck or spout 30 of the storage-hopper is delivered into a valve-chamber 42, arranged directly therebelow and essentially comprising opposite parallel sides 43 and a transverse back plate 44, connecting the sides 43 at the rear ends thereof, the front ends of the side plates 43 being disconnected to provide the valve-chamber with a front open side covered by a segmental regulating-plate 46. The segmental regulating-plate 46 is adjustably supported in any suitable manner, so as to be capable of being readily adjusted up and down to regulate the size of the opening at the front side of the valve-chamber, through which the material can be fed by the transverse horizontal feed-roll 47. The horizontal feed-roll 47 is arranged to rotate directly below the valve-chamber 42 and practically forms the bottom for the lower open side of said chamber, said roll 47 registering in the lower concaved edges 48 of the chamber sides 43, so as to project into the lower open side of the valve-chamber and receive thereon the material which falls into said chamber through the discharge neck or spout 30 of the storage-hopper, and as the said roll 47 rotates it feeds the material through the valve-opening formed at the front side of the valve-chamber, below the lower edge of the regulating-plate 46. The said feed-roll 47 is mounted on a horizontal roll-shaft 49, the opposite spindle extremities of which are journaled in the opposite bearing-collars 50, formed at the lower ends of the opposite depending sides 51 of a skeleton bracket-frame 52, suitably fastened to the frame-support for the storage-hopper 28 and depending therefrom. The valve-chamber 42, directly above the feed-roll 47, is fitted in a stationary position within the skeleton bracket-frame 52 or may be suitably secured to the discharge neck or spout 30 of the storage-hopper, while in Figs. 11 and 12 of the drawings the valve-chamber is illustrated as being formed with the storage-hopper as a part thereof at its lower discharging end, although in the construction illustrated in Figs. 2, 3, 5, and 6 the skeleton bracket-frame 52 provides for the support of the parts of the feed mechanism below the storage-hopper.

In the simple form of the feed-roll 47 illustrated in Fig. 7 of the drawings the same is provided with a smooth or corrugated feeding-surface, but which surface may be of any special form adapted to the various materials it is required to feed; but in every form of the feed-roll 47 the latter is provided at its opposite ends with the friction-disks 53, which may be of a greater or smaller diameter than the body of the roll itself, as illustrated in the different figures of the drawings, and the function of these friction-disks 53 will be more particularly referred to in connection with the means for rotating and stopping the rotation of said roll at the proper time. In the principal forms of the feeding mechanism the feed-roll 47 is illustrated as being a solid cylindrical body having a smooth feeding-surface; but in feeding fibrous substances and the like a special form of feed-roll of the construction illustrated in Figs. 8, 9, and 10 of the drawings may be employed. The modified form of feed-roll $47^a$ is provided at its ends with the friction-disks 53, above referred to, but essentially comprises a series of closely-arranged alternating stationary and rotary roll-disks 54 and 55, respectively, which disks are mounted on the horizontal roll-shaft 49 to complete a feed-roll, which is designed to be arranged in the position of the feed-roll plainly illustrated in Figs. 2 and 3 of the drawings. The disks 54 are provided with plain peripheral edges and are loosely mounted eccentrically on the roll-shaft 49, as illustrated at Fig. 10 of the drawings, said stationary eccentrically-mounted roll-disks 54 being provided at their upper sides with offstanding securing-arms 56, perforated to receive a transversely-arranged securing-rod 57, mounted in the valve-chamber 42 or fitted to any other stationary part of the apparatus to provide means for securing the entire series of disks 54 in fixed stationary positions, while the disks 55, alternating therewith, are allowed to freely rotate therebetween. The roll-disks 55, working between the disks 54, alternating therewith, are mounted fast on the roll-shaft 49 and concentrically therewith, so that the upper peripheral portions of the disks 55 project beyond the corresponding peripheral portions of the disks 54, so as to work in the lower open side of the valve-chamber 52 and provide for the positive feeding of the material through the valve-opening of said chamber, the lower portions of the disks 55 being disposed inside of the plane of the lower peripheral edges of the stationary disk 54 of the roll. The said rotating roll-disks 55 are provided with peripheral projections or teeth 58 or other irregularities to provide for positively engaging the material to be fed out of the valve-chamber, and by reason of the toothed peripheries of the disks 55 receding within the spaces between the stationary disks 54 the said disks 55 automatically clean themselves of clinging material, as will be readily understood.

The valve-opening at the front side of the valve-chamber 42 is covered and uncovered automatically by means of an automatically-controlled swinging cut-off valve 59, essentially comprising the opposite parallel side arms 60 and the segmental valve-plate 61, connecting the arms 60 at one end and having a play in front of the regulating-plate 46 for the valve-chamber, the lower edge of the segmental valve-plate 61 being designed to be automatically drawn against the surface of the feed-roll 47 to provide for entirely closing the valve-opening and cutting off the feed of the material at the proper time. The opposite parallel side arms 60 of the swinging cut-off valve 59 are pivotally mounted at their ends opposite the valve-plates 61 on a transverse pivot-rod 62, transversely connecting the opposite side portions 51 of the skeleton bracket-frame 52, thereby supporting the valve in a manner so that the same can be freely swung up and down to cover and uncover the valve-opening simultaneously with the stopping and starting of the feed-roll, as will be hereinafter more particularly explained.

The material as it is fed through the valve-opening of the chamber 42 by the rotating feed-roll 47 is delivered against the curved deflecting-wall 63 of an adjustable hood 64, forming an impact-breaker. The adjustable hood 64 essentially comprises the parallel side pieces 65, connected at one end by the deflecting-wall 63 and pivotally mounted at their other ends on the spindle extremities of the transverse or horizontal roll-shaft 49, said hood 64 having attached to its upper side a segmental longitudinally-slotted adjusting-arm 66, which adjustably engages with an adjusting-screw 67, mounted at one side of the skeleton bracket-frame and providing means for locking the arm 66 in any adjusted position, and thereby holding the hood 64 stationary when adjusted to the proper angle on its pivot or axis. The adjustable impact-breaking hood 64 is disposed at one side of the vertical center of the roll 47, so as to receive the material as it discharges from the valve-chamber, and said hood has fitted therein a transverse scraper-rod disposed below the roll 47 and having attached thereto a scraper-plate 68, having a scraping blade or edge 69, normally contacting with the surface of the roll 47 to provide for cleaning such surface of clinging material, such scraping or cleaning device being susceptible to modification, as will be hereinafter more particularly referred to.

The curved deflecting-wall 63 of the hood 64 is prolonged into a lower straight extension 70 for deflecting the material out of the hood and for retarding the same sufficiently, so that it will lose its momentum, it being understood that the object of the impact-breaking hood 64 is to overcome the impact of the material thrown off of the revolving feed-roll 47. This is a necessary feature of the feed mechanism, as it is evident that the force exerted by the material thrown off of the roll, if permitted to act directly upon the bucket of the weighing-wheel, would tend to produce motion in the scale mechanism, which would then not be a constant factor in the weight of such materials as dried currants, tea, and the like, whose particles are of varying size and weight.

The lower straight extension 70 of the impact-breaking hood 64 delivers the material to be weighed against the inclined side wall 71 of an adjustable delivery-chute 72, which acts in the capacity of a column-breaker to provide a break in the fall of the column of material from the feed-roll and the hood 64, so as to cause the material to slide into the bucket of the weighing-wheel as gently as possible, and thereby insuring the weighing of the last particles of material entering the wheel. The column-breaking delivery-chute 72 is somewhat segmental in shape and essentially comprises the opposite parallel sides 73, the inclined side wall 71, and the segmental side wall 74, located opposite the wall 71, said walls 71 and 74 being spaced to provide the chute with upper and lower open ends, the lower open end of the chute being designed to be adjusted to a position directly over the feed or inlet opening 5 of the weighing-receptacle 4. The adjustable delivery-chute 72 is disposed at an angle to a vertical plane and is provided at its lower side with the ears 75, fitted on a transverse adjusting-rod 76, the opposite ends of which are adjustably secured in the longitudinally-disposed slots 77 of the parallel horizontal supporting-bars 78, arranged at opposite sides of the chute 72 and of the weighing-receptacle and supported at their ends on the upper ends of the short vertically-adjusting supporting-posts 79, adjustably fitted at their lower ends in the sockets 80, secured on the supporting-cleats 81, fitted to opposite sides of the weighing receptacle or case at the upper side thereof. The adjustable supports described provide simple and efficient means whereby the chute 72 has practically a universal adjustment, so that it may be adjusted at any angle or in any position, according to the requirements of the material being delivered thereinto from the impact-breaking hood 64.

By reason of mounting the column-breaking delivery-chute 72 in the manner described it will be observed that this chute is capable of a vertical, horizontal, and axial adjustment, and after adjustment can be secured rigidly in place to provide for breaking the column of material delivered therein from the feed mechanism thereabove. Each of the several adjustments referred to is quite essential to adapt the feeding mechanism for different kinds of material—as, for instance, in a machine that is weighing coarse granulated sugar the column-breaking delivery-chute requires less inclination than if the same machine were weighing a finer grade of sugar, or, again, if hominy-grits are being weighed the inclination will be still less—so for these reasons it is necessary that the column-breaking delivery-chute be capable of axial adjustment.

It will be obvious that when the angle of inclination of the chute 72 is changed the inclined bottom plate 71 thereof will necessarily be caused to come very close to the point of discharge from the hood 64, or so far away from such point of discharge as to materially increase the column of material in the air, which always affects the weights of the material. These improper positions of the delivery-chute are corrected by the horizontal adjustment thereof, while the vertical adjustment of the column-breaker or delivery-chute provides means whereby the same can be moved a proper relative distance from the point of discharge thereabove. This vertical adjustment is quite important in the event of the load to be weighed being small in comparison to the capacity of the bucket in the weighing-wheel, as in such case the chute must be adjusted as close as possible to the feeding mechanism.

An essential feature with reference to the column-breaking plate or chute 72 is the mounting of such plate or chute upon the weighing-receptacle independently of the feed mechanism. By reason of having the column-breaking plate or chute supported by the weighing-receptacle the column of material in the air at the instant of the closing of the cut-off valve of the feed mechanism is reduced to a minimum, such column of material in the air being the column of material in the space between the bulk load in the weighing-receptacle and the cut-off valve of the feed mechanism. In this connection it will be observed that inasmuch as the column-breaking plate or chute is mounted on the weighing receptacle or case the said plate or chute is made a part of the constant load on the scale, which is suitably counterbalanced, so that the column or stream of material passing over the column-breaking plate or chute is weighed by the scale, whereas if the column-breaking plate or chute were mounted on the feed mechanism, or independent of the weighing receptacle or case, the amount of the column of material in the air might be sufficiently reduced, but the scales would not weigh that material passing between the column-breaker and the weighing-receptacle at the instant the cut-off valve is closed, thereby causing a variation in the weighings too great for the purposes for which the herein-described machine is designed. Furthermore, by supporting the column-breaking plate or chute on the weighing-receptacle permits the use of the true weighings on the scale-beam, whereas with the column-breaking plate or chute fastened to the feed mechanism, or independently of the weighing receptacle or scale, it would be necessary to counterbalance the aforesaid column of material in the air between the cut-off valve and the bulk of material in the wheel of the weighing-receptacle, which varies if the flow of material is not perfectly uniform.

The swinging cut-off valve 59 is automatically raised and lowered through the medium of a pair of connecting bars or rods 82, arranged, respectively, at opposite sides of the cut-off valve within the bracket-frame 52 and pivotally connected at one end, as at 83, respectively at opposite sides of the said valve. The other ends of the connecting bars or rods 82 are pivotally connected with the horizontal shaft 84 at the lower end of an oscillating gearing-frame 85. The oscillating gearing-frame 85 essentially comprises a pair of opposite parallel swinging frame-bars 86, connected at their upper ends by a transverse connecting-rod 87 and pivotally mounted intermediate of their upper and lower ends on a transverse pivot-shaft 88, journaled at its opposite spindle extremities in the bearing-collars 89, formed in diametrically opposite side portions of the bracket-frame 52. The transverse pivot-shaft 88, which pivotally supports the oscillating frame 85, has mounted thereon a belt-pulley 90, which receives the endless motion-belt 91, receiving its motion from an oppositely-located belt-pulley 92, mounted on a short drive-shaft 93, journaled in a suitable bearing-bracket 94, adjustably secured on the upright rod 34 of the main supporting-frame, and said short drive-shaft 93 also has mounted thereon a belt-wheel 95, which receives the main drive-belt 96, leading from the engine or any other machinery employed to communicate motion to the working parts of the feed mechanism. Through the means of the connections described a constant rotation is imparted to the pivot-shaft 88 of the oscillating frame, and said pivot-shaft also has mounted thereon a friction-wheel 97, having a positive peripheral frictional contact with the friction wheel or disk 98, arranged therebelow and mounted on the lower horizontal shaft 84, carried by the frame 85. The wheels 97 and 98 provide for imparting a constant rotation to the lower shaft 84, which shaft also carries oppositely-located friction-wheels 99, adapted to be moved in and out of contact with the friction-disks 53 at opposite ends of the feed-roll; but it will of course be understood that the frictional gearing just described may be substituted by other forms of gear-wheels which will necessarily accomplish the same result—namely, a starting up and stopping of the feed-roll at the proper time.

The transverse connecting-rod 87 at the upper end of the oscillating gearing-frame 85 has pivotally connected thereto one end of a connecting-rod 100, the other end of which connecting-rod is suitably attached at 101 to a swinging lever 102, pivotally suspended from a suitable support 103 on the frame-rod 32 and pivotally connected at its lower end to a rod-sleeve 104, adjustably clamped on a rod 105, pivotally clamped at one end, as at 106, on the upper end of an upright controlling-lever 107, pivotally supported near its lower end in a pivotal support 108, fitted on the floor supporting the apparatus or at another suitable location. At a point intermediate of its upper and lower ends the controlling-lever 107 has adjustably fitted thereon a socket-piece 109, in which is adjustably secured a strike-rod 110, provided at its outer end with a foot 111, adapted to contact with the outer end of the release-rod 22 to provide for the automatic inward movement of said rod and the consequent releasing or unlocking of the weighing-wheel in the manner hereinbefore fully explained.

At its lower end the upright swinging controlling-lever 107 is pivotally connected at 112 to one end of an adjusting-rod 113, the other end of which rod is secured fast to a cross bar or head 114, which connects the parallel sliding solenoid-cores 115. The sliding solenoid-cores 115 have their opposite end portions working inside of separate and oppositely-located pairs of solenoids 116 and 116ᵃ, respectively, each pair of solenoids being independently supported on its U-shaped yoke 117, and the oppositely-located solenoids being arranged with their core-openings in alinement with each other in order to allow their cores to slide freely back and forth in either direction, according to which pair of solenoids or magnets is energized at a given moment of time. The oppositely-located solenoids 116 and 116ᵃ have one of their terminals connected with the battery-wire $a$, respectively, by means of the wire connections $b$ and $c$. The battery-wire $a$ for the sake of convenience may be said to be connected to the positive pole of a battery 118 or other source of electrical energy. The other terminal of the solenoids 116 has a wire connection $d$ with the binding-post support 119 for the stem 120 of a flat contact-plate 121, which is engaged and disengaged by the flat contact-plate 122 at the lower end of a swinging circuit-breaking arm 123. The circuit-breaking arm 123 is suitably fastened at its upper end, as at 124, to one side of the scale-beam 3 near its pivotal support, so that when said scale-beam rises and falls the arm 123 will swing in the direction indicated by the dotted line in Fig. 13 and will cause the plate 122 to make and break the contact with the plate 121, included in the circuit of the solenoid wire connection $d$. Near its fixed upper end the circuit-breaking arm 123 has a depending circuit-closing foot 125, working in a cup of mercury 126, which is in electrical connection with the solenoid-wire $e$, connected with one terminal of a circuit-controlling solenoid 127, the other terminal of which has a wire connection $f$ with the battery-wire $g$, connected with the negative pole of the battery.

The circuit-controlling solenoid 127, which can obviously be situated in any suitable position, accommodates for movement therein the sliding solenoid-core 128, carrying at its outer or lower end a cross-head 129, in the extremities of which are adjustably fitted contact-screws 130, adapted to respectively contact with the oppositely-located mercury-cups or similar fixed contacts 131, mounted on a suitable stationary support 132, arranged below the solenoid 127. The fixed support 132 has mounted therein between the fixed contacts 131 an adjustable stop-screw 133, adapted to contact with the cross-head 129, so that the rise and fall of the core 128 may be properly adjusted. One of the fixed contacts 131 has a wire connection $h$ with the battery-wire $g$, and the other of the said contacts 131 has a wire connection $i$ with the terminal of the solenoids 116ᵃ opposite the terminal connected with the positive pole of the battery 118.

Having explained the essential parts of the feeding device irrespective of modifications, which will be hereinafter particularly referred to, it is thought that the operation of the entire apparatus can be readily understood.

Assuming a bucket of the weighing-wheel 7 to have just discharged its load, the scale-beam 3 of the platform-scales will drop down to its normal position, thereby swinging the contacting surface 122 into contact with the fixed contact-surface 121 and completing an electrical circuit over the wires $a\ b$, solenoids 116, wire $d$, circuit-breaking arm 123, wire $e$, solenoid 127, wire $f$, and battery 118. The closing of this circuit energizes the solenoids 116 and the solenoid 127, the energizing of the solenoids 116 causing a movement of the cross bar or head 14 to the position shown in Figs. 1 and 14, and the energization of the solenoids 127 serving to raise the contact-screws 130 and break the line of the circuit connection with the solenoids 116ᵃ. When the cross bar or head 114 is drawn in one direction by the energization or activity of the magnets or solenoids 116, the levers 107 and 102 will be moved in a direction to exert a pulling action on the connecting-rod 100 and oscillate the gearing-frame 85 to the position illustrated in Figs. 1 and 2 of the drawings, in which position the friction-wheels 99 will be held in contact with the friction-disks 53 at opposite ends of the feed-roll to start up the rotation of such roll. At the same moment that the friction-disks 99 are thrown into contact with the friction-disks of the feed-roll the connecting bars or rods 82 swing the cut-off valve 59 upward and allow the feed-roll to feed the material into the impact-breaking hood 64 and from thence into the column-breaking chute 72. At the instant the scale receives a sufficient load to bring it to a balance the contacting surfaces 122 and 121 will be separated by the upward movement of the scale-beam 3 to the point of balance. This separation of the contacts 122 and 121 will immediately interrupt the current flowing through the solenoid 127 and allow the contact-screws 130 to fall into contact or metallic connection with the fixed contacts 131, thereby closing a circuit over the wires $a\ c$, solenoids 116ᵃ, wire $i$, circuit-closer comprising the screws 130 and contact 131, wires $h$ and $g$, and the battery 118. The closing of this circuit energizes the solenoids 116ª, whose activity draws the cross bar or head 114 to the position shown in Fig. 15, which movement causes an oscillation of the levers 107 and 102 in a direction which swings the gearing-frame 85 on its pivotal support, so as to carry the friction-wheels 99 out of contact with the friction-disks of the feed-roll to automatically and instantly stop the rotation of such roll and at the same time automatically close down the cut-off valve over the valve-opening of the valve-chamber, thereby stopping the feed. When the lever 107 is moved in a direction to stop the feed of the feeding mechanism in the manner described, the strike-rod 110 will be carried against the outer end of the release-rod 22 to provide for the releasing or unlocking of the weighing-wheel, so as to permit such wheel to revolve and discharge its load ready for the next weighing operation.

Certain modifications of the herein-described apparatus may be resorted to without departing from the principles of the invention, and one of these modifications is illustrated in Fig. 4 of the drawings, in which modification a vertical stirrer or agitator shaft 135 is employed. The vertical stirrer or agitator shaft 135 is mounted in suitable bearings within the storage-hopper 28 and carries a plurality of separate sets of radially-extending stirrer-arms 136, working in the flared and contracted portions of the hopper to provide means for stirring up the material and preventing the packing thereof, as would necessarily occur under certain conditions, and a deflecting-cone 137 is supported over the upper end of the shaft 135 to properly deflect the material into the path of the stirrer-arms 136. A beveled gear-wheel 138 is mounted on the upper end of the shaft 135 and meshes with an adjacent similar wheel 139 at the inner end of a horizontal shaft 140, journaled in suitable bearings within the upper end of the hopper 28. The shaft 140 carries at its outer end a beveled gear-wheel 141, meshing with an adjacent similar wheel 142 at the upper end of a vertical drive-shaft mounted in suitable bearings 144 and carrying at its lower end a beveled gear-wheel 145, meshing with a similar adjacent wheel 146 on one of the spindle extremities of the roll-shaft 49, thus completing a gearing connection with the stirrer or agitator, so that the latter will be started or stopped simultaneously with the starting and stopping of the feed-roll.

In Figs. 5 and 6 of the drawings a modification is illustrated in which an impact-breaking hood 64ª is employed in the supplementary capacity of a second swinging lower cut-off valve, and the curved deflecting-wall 63ª of this lower swinging cut-off valve 64ª forms a valve-plate adapted to work against a stationary inclined valve-plate 147, arranged between a pair of hangers 148, suspended from the side portions of the bracket-frame 52, so as to dispose the stationary plate 147 below the feed-roll and within the upper portion of the delivery column-breaking chute 72. At one side of the inclined stationary valve-plate 147 the hangers 148 support in an inclined position the water box or chamber 149, having a wick-tube 150, in which is placed a roll-cleaning wick 151, contacting with the feeding-surface of the feed-roll and serving to keep the same perfectly clean, which is especially effective in weighing material of a sticky nature, this construction being a modification of the cleaning device illustrated in Figs. 2 and 3 of the drawings.

In the modifications shown in Figs. 5 and 6 the upper and lower cut-off valves 59 and 64ª are connected for simultaneous movement by the connecting-links 152, which are in turn connected with the connecting bars or rods 82, whereby the oscillations of the gearing-frame 85 provide for the simultaneous movement of the two cut-off valves.

In the modification illustrated in Figs. 11 and 12 the valve-chamber 42 is illustrated as forming a part of the storage-hopper, as hereinbefore referred to, and in this construction the use of a feed-roll and impact-breaking hood is dispensed with and the material discharged directly into the delivery-chute. While a feed-roll is not employed in this construction, the shaft 49 is used to communicate motion to a pair of horizontal stirrer-shafts 153, arranged horizontally one above the other in the storage-hopper and carrying a plurality of radially-extending stirring-fingers 154, said shafts 153 carrying at one end beveled gear-pinions 155, meshing with adjacent similar pinions 156 on the upright shaft 143ª. The shaft 143ª is geared at 157 with one end of the shaft 49 to complete the gearing connections between such shaft as the stirrers, which are automatically stopped and started with the stopping and starting of the said shaft 49. In the construction described a jointed-rod connection 82ª connects the cut-off valve with the oscillating gearing-frame 85 and the deflecting-cone 137ª is arranged above the uppermost stirrer or agitator.

Other modifications will suggest themselves to those skilled in the art, and it will be understood that various changes in the form, proportion, and the minor details of construction may be resorted to without departing from the principle or sacrificing any of the advantages of this invention.

Having thus described the invention, what is claimed and desired to be secured by Letters Patent is—

1. In an automatic weighing apparatus, a weighing-receptacle, a compartment weighing-wheel mounted in said receptacle and carrying a notched disk on one of its shaft extremities, a pawl-lever pivotally mounted on the receptacle and having its free end engaging with the notches of said disk, a release-rod slidably mounted on the weighing-receptacle, and coöperating at one end with the pawl-lever to disengage the latter from said disk, a feed mechanism arranged above the weighing-receptacle, and automatically-operating controlling mechanism having means for starting and stopping the operation of the feed mechanism, and also for automatically moving the release-rod into operative engagement with the pawl-lever, substantially as set forth.

2. In a weighing apparatus, a weighing receptacle or case, a compartment weighing-wheel mounted in said receptacle and carrying a peripherally-notched stop-disk on one of its shaft extremities, a pawl-lever pivotally mounted on the receptacle and having its free end engaging with the notches of said stop-disk, a normally upright segmental cam-plate pivotally mounted on the pawl-lever between the ends thereof and provided at its upper corner with a stop-shoulder, a check-dog arranged on the pawl-lever with one end normally engaging with said stop-shoulder, a spring-retracted release-rod slidably mounted at one side of the weighing-receptacle and provided at one end with a shoulder-contacted foot to engage with the rounded and flat sides of the cam-plate, and means for automatically moving the release-rod inward when the feeding of the receptacle has ceased, substantially as set forth.

3. In an automatic weighing apparatus, a weighing-receptacle, a compartment weighing-wheel mounted within the receptacle and carrying a peripherally-notched stop-disk on one of its shaft extremities, a pawl-lever pivotally mounted on the receptacle so as to engage at its free end with said stop-disk and carrying a cam-plate, a spring-retracted release-rod slidably mounted at one side of the receptacle and working at one end against one end of the cam-plate to provide for lifting the pawl-lever, a feed mechanism arranged above the weighing-receptacle, and an automatically-controlled lever having connections with the feed mechanism to start and stop the same, and carrying a strike-rod adapted to move against one end of the release-rod, substantially as set forth.

4. In a feed mechanism for weighing-receptacles and the like, a hopper communicating at its lower end with a discharge-opening, a cut-off valve arranged to cover and uncover the discharge-opening, means for automatically operating the valve, a separate column-breaking plate or chute supported by the weighing-receptacle independently of the feed mechanism proper in a plane below said discharge-opening, and means for adjusting said plate or chute to variable positions relatively to the point of discharge thereabove and for holding the same rigid in any adjusted position, substantially as set forth.

5. A feed mechanism for weighing-receptacles and the like comprising a storage and feed hopper, having a discharge neck or spout at its lower end, a valve-chamber communicating with the discharge neck or spout of the hopper and provided at its lower side with a valve-opening, a column-breaking plate or chute arranged at a point below the valve-opening of the valve-chamber, and a swinging cut-off valve having a valve-plate, adapted to cover and uncover the valve-opening, and means for automatically raising and lowering the swinging cut-off valve, substantially as set forth.

6. In a feed mechanism for weighing-receptacles and the like, a storage-hopper, valve mechanism arranged at the lower end of the hopper, means for automatically operating said valve mechanism, a vertically-adjustable support carried by the weighing-receptacle or weighing mechanism, independently of the hopper and its valve mechanism, and an adjustable column-breaking plate or chute arranged below the point of discharge thereabove and having a pivot-rod connection with said support, said pivot-rod connection being longitudinally adjustable of the support, and means for securing the chute rigid in any of its adjusted positions, substantially as set forth.

7. A feed mechanism for weighing-receptacles and the like comprising a storage-hopper, a valve-chamber arranged at the lower end of the hopper and provided with a valve-opening in its front side, a swinging cut-off valve working over said valve-opening, a horizontal rotating feed-roll mounted for rotation at the lower open side of the valve-chamber, an impact-breaking deflecting device arranged below the valve-opening at one side of the roll, and means for automatically and simultaneously adjusting the position of the cut-off valve and stopping and starting said roll, substantially as set forth.

8. A feed mechanism for weighing-receptacles and the like comprising a storage-hopper, a valve-chamber arranged at the lower end of the hopper and provided with a valve-opening at its front side, a swinging cut-off valve having a segmental valve-plate working over said valve-opening, a horizontal rotating feed-roll working in the lower open side of the valve-chamber, an adjustable impact-breaking hood mounted at one side of the vertical center of the roll and provided with a curved deflecting-wall disposed below the valve-opening, a column-breaking delivery-chute having an inclined side wall disposed below and opposite the lower end of the deflecting-wall of said hood, and means for automatically adjusting the position of the cut-off valve and simultaneously stopping and starting the roll, substantially as set forth.

9. A feed mechanism for weighing-receptacles and the like comprising a storage-hopper, a valve-chamber arranged at the lower end of the hopper and provided with a valve-opening at its front side, a swinging cut-off valve arranged to work over the valve-opening, a horizontal rotating feed-roll working at the lower open side of the valve-chamber, an adjustable hood pivotally mounted at one side of the vertical center of the roll and provided with a curved deflecting-wall disposed below the valve-opening, means for adjusting said hood on its axis, an adjustable delivery-chute having an inclined side wall disposed below and opposite the lower end of the deflecting-wall of the hood, and means for automatically adjusting the position of the cut-off valve and for stopping and starting the roll, substantially as set forth.

10. A feed mechanism for weighing-receptacles and the like comprising a storage-hopper, valve mechanism arranged at the lower end of the hopper, an impact-breaking deflecting-hood having a curved deflecting-wall disposed below and at one side of the valve mechanism, a vertically, horizontally, and axially adjustable column-breaking delivery-chute supported below the discharging end of said deflecting device, and means for automatically operating said valve mechanism, substantially as set forth.

11. A feed mechanism for weighing-receptacles and the like comprising a storage-hopper, valve mechanism arranged at the lower end of the hopper, an impact-breaking hood having a curved deflecting-wall disposed below and at one side of the valve mechanism, a pair of vertically-adjustable longitudinally-slotted horizontal supporting-bars arranged at opposite sides of the weighing-receptacle or other device being fed, an adjustable segmentally-shaped column-breaking delivery-chute open at its upper and lower ends and having an inclined side wall disposed below and opposite the lower end of the deflecting-wall of said hood, a transverse adjusting-rod fitted to the under side of the delivery-chute and adjustably secured at its ends in the slots of said supporting-bars, and means for automatically operating said valve mechanism, substantially as set forth.

12. A feed mechanism for weighing-receptacles and the like comprising a storage-hopper, a valve-chamber communicating with the lower end of the hopper and provided with a valve-opening at its front side, a feed-roll mounted for rotation at the lower open side of the valve-chamber, a movable cut-off valve arranged to cover and uncover the valve-opening, a suitably-supported oscillating gearing-frame carrying constantly-rotating gears certain of which are adapted to be thrown in and out of gear with the feed-roll shaft, a rod connection between the movable valve and said gearing-frame, and electrically-controlled means for automatically oscillating the gearing-frame in either direction to provide for automatically and simultaneously controlling the adjustment of the cut-off valve and the movement of the feed-roll, substantially as set forth.

13. A feed mechanism for weighing-receptacles and the like comprising a suitable supporting-frame, a skeleton bracket-frame suspended from said supporting-frame, a storage-hopper mounted on the supporting-frame, a valve-chamber communicating with the lower end of the hopper and provided with a valve-opening at its front side, a feed-roll having its shaft extremities journaled in the bracket-frame and arranged to rotate at the lower open side of the valve-chamber, said feed-roll being provided at its opposite ends with friction-disks, a movable cut-off valve arranged to work against the feed-roll to cover and uncover the valve-opening, an oscillating gearing-frame pivotally supported in the bracket and carrying a pair of constantly-rotated friction-wheels adapted to be moved in and out of contact with the friction-disks of the feed-roll, a rod connection between the cut-off valve and said oscillating frame, and electrically-controlled means for automatically oscillating the gearing-frame in either direction, substantially as set forth.

14. A feed mechanism for weighing-receptacles and the like comprising a suitable supporting-frame, a skeleton bracket-frame suspended from said supporting-frame, a stationary storage-hopper having a valve-chamber at its lower end provided with a valve-opening at its front side, a horizontal feed-roll journaled in the bracket-frame and rotating at the lower open side of the valve-chamber, said feed-roll being provided at its opposite ends with friction-disks, a movable cut-off valve arranged to cover and uncover the valve-opening, a transverse pivot-shaft mounted in the bracket-frame, an oscillating gearing-frame pivotally supported on said pivot-shaft and carrying at its lower end a shaft suitably geared with the pivot-shaft and having a pair of friction-wheels adapted to be moved in and out of contact with the friction-disks of the feed-roll, means for imparting a constant rotation to said pivot-shaft, a rod connection between the cut-off valve and said oscillating frame, and electrically-controlled means having suitable lever connections with said oscillating frame to provide for the automatic oscillation thereof on its axis, substantially as set forth.

15. In feed mechanism for weighing-receptacles and the like the combination with the storage-hopper and valve mechanism, of a horizontal feed-roll supported below the hopper and comprising a series of closely-arranged alternating stationary and rotary disks, disposed eccentrically to each other, and the rotating disks being provided with irregular or toothed peripheries traveling between the stationary disks and also within the lower open side of the hopper, substantially as set forth.

16. In feed mechanism for weighing-receptacles and the like the combination with the storage-hopper and the valve mechanism, of a horizontal feed-roll supported below the hopper and comprising a series of closely-arranged alternating stationary and rotary disks disposed eccentrically to each other, the stationary disks of the roll having a stationary support, and the rotating disks having peripheral projections or irregularities traveling between the stationary disks and also within the lower open side of the hopper, substantially as set forth.

17. In an electrical weighing apparatus, the combination of a platform-scale, a weighing-receptacle arranged on the platform of the scale, feed mechanism supported above the weighing-receptacle and having a movable cut-off valve, separate alined solenoids having a common sliding core, suitable lever connections between said core and the cut-off valve, a circuit-breaking device operated by the scale-beam of the scale, a separate circuit-controlling solenoid, a circuit-closing device operated by said circuit-controlling solenoid, battery or other electrical supply circuit connections with one set of solenoids, the circuit-breaking device and the circuit-controlling solenoids, and a separate set of battery-circuit connections with the other set of solenoids and said circuit-closing device, substantially as set forth.

18. In an electrical weighing apparatus, the combination of a platform-scale, a weighing-receptacle arranged on the platform of the scale, feed mechanism supported above the weighing-receptacle and having a movable cut-off valve, oppositely-located pairs of alined solenoids having common sliding cores, suitable lever connections between said sliding cores and the cut-off valve, a swinging circuit-breaking arm attached at its upper end to the scale-beam and provided at its lower end with a contact-plate, a fixedly-positioned contact-plate adapted to make and break a contact with the contact-plate of said circuit-breaking arm, a separate circuit-controlling solenoid having a sliding core, a circuit-closing device operated by the sliding core of said controlling-solenoid, a battery or other electrical supply circuit having wire connections including one pair of solenoids, the circuit-breaking contacts, the circuit-breaking arm and the separate controlling-solenoid, and separate battery or other electrical supply circuit wire connections with the other pair of solenoids and the contacts of the circuit-closing device, substantially as set forth.

19. In an electrical weighing apparatus, the combination of a platform-scale, a weighing-receptacle arranged on the platform of the scale, feed mechanism supported above the weighing-receptacle and having a movable cut-off valve, oppositely-located pairs of alined solenoids having common sliding cores, suitable lever connections between said cores and the cut-off valve, a swinging circuit-breaking arm attached at its upper end to the scale-beam and having a mercury-cup connection with such end, a fixedly-positioned contact-plate adapted to make and break a contact with the lower end of the circuit-breaking arm, a separate circuit-controlling solenoid having a sliding core carrying oppositely-located contact-screws, fixed circuit-closer contacts arranged below the contact-screws, a battery-circuit having wire connections including one pair of solenoids, the circuit-breaking contacts, the circuit-breaking arm and the controlling-solenoid, and separate battery-circuit wire connections with the other pair of solenoids and said circuit-closer contacts, substantially as set forth.

20. In a feed mechanism for weighing-receptacles and the like, a storage-hopper, valve mechanism arranged at the lower end of the hopper, means for automatically operating said valve mechanism, a vertically, horizontally, and axially adjustable column-breaking plate or chute supported by the weighing receptacle or mechanism independently of the storage-hopper and valve mechanism in a plane below the point of discharge for the material, and means for securing the chute rigid in any of its adjusted positions, substantially as set forth.

21. In a feed mechanism for weighing-receptacles and the like, a hopper, valve mechanism arranged at the lower end of the hopper, means for operating said valve mechanism, a vertically-adjustable column-breaking plate or chute supported by the weighing receptacle or mechanism independently of the hopper and valve mechanism in a plane below the valve mechanism, and means for securing the chute rigid in any adjusted position, substantially as set forth.

22. In a feed mechanism for weighing-receptacles and the like, a hopper, valve mechanism arranged at the lower end of the hopper, means for operating said valve mechanism, a horizontally-adjustable column-breaking plate or chute supported by the weighing receptacle or mechanism independently of the hopper and valve mechanism in a plane below the valve mechanism, and means for securing the chute rigid in any adjusted position, substantially as set forth.

23. In a feed mechanism for weighing-receptacles and the like, a hopper, valve mechanism arranged at the lower end of the hopper, means for operating said valve mechanism, a vertically and horizontally adjustable column-breaking plate or chute supported by the weighing receptacle or mechanism independently of the hopper and valve mechanism in a plane below the valve mechanism, and means for securing the chute rigid in any of its adjusted positions, substantially as set forth.

In testimony that we claim the foregoing as our own we have hereto affixed our signatures in the presence of two witnesses.

JOHN OUTCALT.
DAVID DE RYSTER ACKER OUTCALT.

Witnesses:
JOSEPH C. BRAMAN,
WM. M. PITTY.